| | United States Patent [19] | [11] | 4,133,348 |
|---|---|---|---|
| Spitz | | [45] | Jan. 9, 1979 |

[54] SOLENOID OPERATED VALVES

[76] Inventor: Russell W. Spitz, 6802 Tanglewood Dr., Boardman, Ohio 44512

[21] Appl. No.: 782,769

[22] Filed: Mar. 30, 1977

[51] Int. Cl.² ............................................ F16K 31/02
[52] U.S. Cl. .......................... 137/625.65; 137/625.68; 251/368; 251/129
[58] Field of Search ...................... 137/625.68, 625.65, 137/625.69; 251/DIG. 1, 368, 129; 277/165, 205

[56] References Cited

U.S. PATENT DOCUMENTS

| 2,883,145 | 4/1959 | Sage | 251/368 X |
|---|---|---|---|
| 2,955,539 | 10/1960 | Gardner | 251/129 X |
| 3,076,476 | 2/1963 | Campbell | 137/605.68 |
| 3,430,613 | 3/1969 | Barnes | 251/368 X |
| 3,557,824 | 1/1971 | Krehbiel | 251/368 X |
| 3,580,286 | 5/1971 | Bash | 251/368 X |
| 3,603,603 | 9/1971 | Woodson | 277/165 |
| 3,719,199 | 3/1973 | Mentink | 137/625.69 X |
| 3,819,152 | 6/1974 | Clippard | 251/DIG. 1 X |

Primary Examiner—Harold W. Weakley
Attorney, Agent, or Firm—Michael Williams

[57] ABSTRACT

A valve comprising a valve body having a bore, a hollow plunger reciprocable within said bore and having radial ports to control flow of fluid under pressure between various valve body openings. Seals are disposed about the exterior surface of the plunger to seal against fluid flow longitudinally of the bore. The seals are of a type that offer low resistance to movement of the plunger from a static condition, and the exterior surface of the plunger has an extremely smooth finish and is of a comparatively small outside diameter to further reduce resistance to plunger movement. The valve construction is such that whenever a plunger port passes underneath a seal, fluid pressure is always from the inside of the plunger to the outside so that there is a tendency to temporarily lift the seal from the exterior surface of the plunger or at least to prevent the seal from being forced into the plunger port. The foregoing provides a low friction valve wherein the plunger may be moved from one position to another with a minimum of force so that a relatively small solenoid may be used to provide the moving force for the plunger.

1 Claim, 4 Drawing Figures

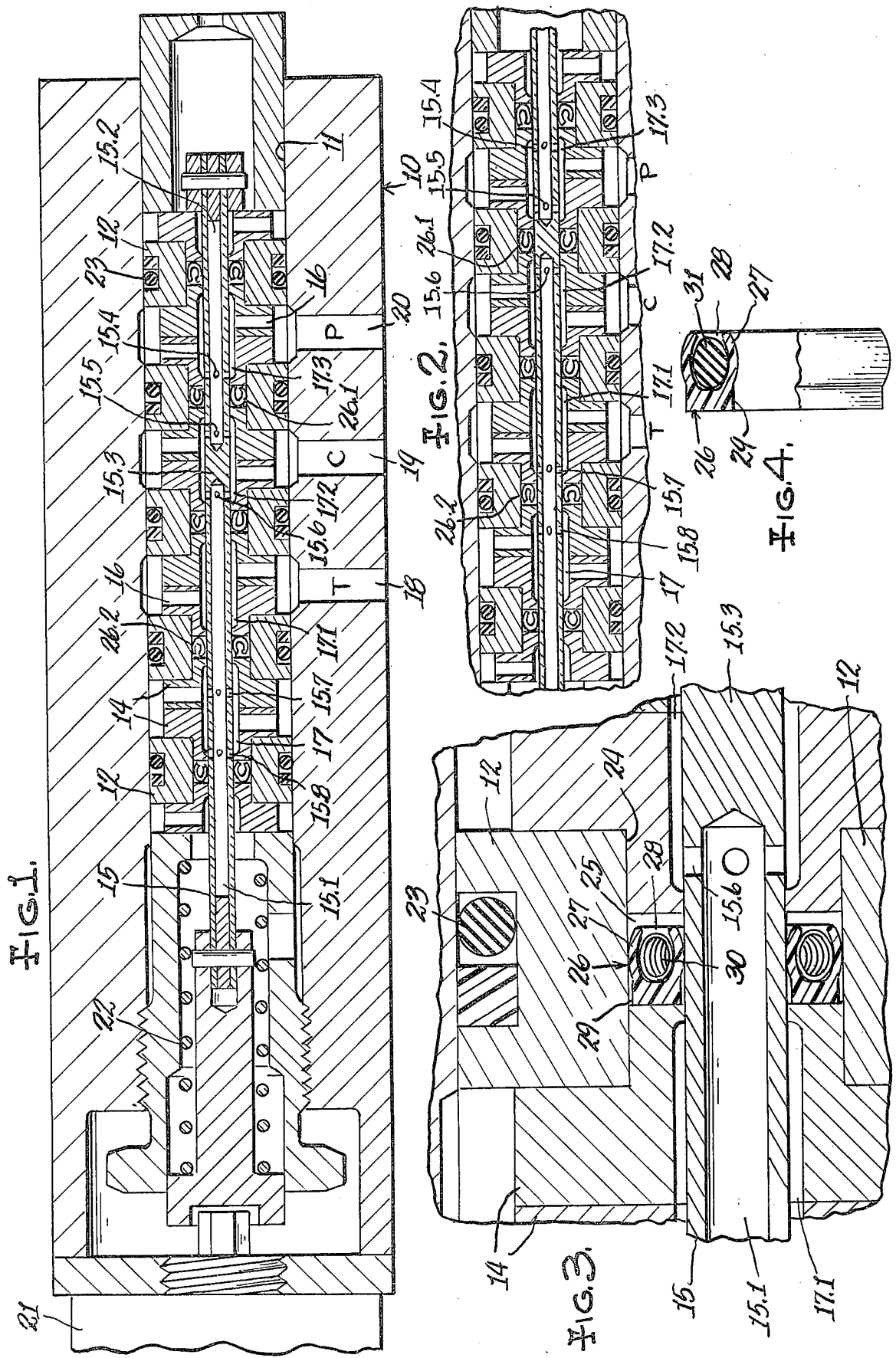

SOLENOID OPERATED VALVES

BACKGROUND AND SUMMARY

The smooth shifting of a valve plunger from one position to another is an important factor in valve design. It is a known fact that it takes more power to move a valve plunger from a stationary position and the pressure so required is commonly termed the breakaway pressure. Valves heretofore made have required a high degree of breakaway pressure and this has pretty well ruled out the use of a reasonable sized solenoid for moving the valve plunger, and has dictated the need for fluid power and a fluid controlled valve to deliver the required force needed to shift the valve plunger.

My invention makes it possible to shift the valve plunger with a low breakaway pressure and this has permitted the use of an industry standardly-accepted solenoid for this purpose. In addition, because of the low breakaway pressure required, the plunger may have a spring return that is reliable at all times. An important factor of my invention is the combination of a low friction seal between the external surface of the valve plunger and the internal surface of the bore in which the plunger reciprocates, together with a small diameter plunger having a high degree of finish on its external surface, and a construction wherein fluid pressure is from the interior of the plunger when a plunger port crosses a seal.

DESCRIPTION OF THE DRAWING

In the drawing accompanying this specification and forming a part of this application, there is shown, for purpose of illustration, an embodiment which my invention may assume, and in this drawing:

FIG. 1 is a longitudinal sectional view through a valve, showing the particular sealing means used in my inventive concept on a very small scale and showing the valve plunger in one position, FIG. 2 is a fragmentary sectional view similar to FIG. 1, showing the valve plunger in another position, FIG. 3 is a fragmentary enlarged view of a portion of FIG. 1, and FIG. 4 is a sectional view, partly in elevation, illustrating a slight modification of the seal shown in FIG. 3.

DESCRIPTION OF THE PREFERRRED EMBODIMENT

The valve shown in FIG. 1 is a three-way, two-position valve, but my invention is not limited thereto, since it is equally effective in four-way, two-position valves, or four-way, three-position valves, or valves of any other well-known type. Accordingly, the following description of the valve shown in FIG. 1 is to be taken only as illustrative of valve construction in general, and not as a limitation to any particular type of valve.

The valve shown in FIG. 1 is adapted for use as a pilot valve and is of the normally open type, and comprises a body 10 having a bore 11 therethrough. A plurality of similar glands 12 and separators 14 are serially disposed within the valve bore 11, the inner diameter of the separators 14 defining a plunger bore in which a valve plunger 15 is reciprocable. Each of the separators 14 is herein shown as of a two-part construction, with cross bores 16 formed therein to establish communication with elongated annular chambers 17, 17.1, 17.2, and 17.3, the chambers 17.1, 17.2 and 17.3 being in communication with respective valve ports 18, 19 and 20, which are respectively connected to tank, cylinder and pressure (not shown). The valve plunger 15 is hollow and provided with radial ports to effect control of pressure fluid.

A solenoid 21 is mounted on the valve body 10 and, when energized, is adapted to move the valve plunger to the right, as viewed in FIG. 1. A coil spring 22 is adapted to move the valve plunger to the left when the solenoid is deenergized.

The glands 12 carry static seals, such as the O-rings 23, to seal against passage of fluid along the bore 11 of the valve body 10. The separators 14 on opposite sides of a gland have reduced portions fitting within an internal opening 24 in the same, but are spaced to provide a relatively narrow annular chamber 25 in which are disposed dynamic seals 26 which surround the valve plunger and are positioned against the circular surface of the internal openings 24 in respective glands.

Each seal 26 is made of a low friction material and in the presently disclosed embodiment, these seals are formed as jacket 27 of somewhat C-shape to provide an annular side opening 28. As seen in FIG. 1, the side openings of the respective seals are disposed to face the system pressure so that the lips of the C-shaped seals have a tendency to spread apart when the seal is subjected to system pressure. As seen in FIG. 3, each of the seal jackets 27 has a reduced upstream wall 29 so that only the lips engage the surfaces to be sealed.

The seal jackets are formed of Teflon, or Teflon alloys using strengtheners such as graphite, carbon, glass fiber, metal oxides, and the like, dependent upon particular requirements. Since Teflon has rather poor memory characteristics, it is preferable to disposed a metal spring 30 (FIG. 3) or an elastomeric spring 31 (FIG. 4) within the jacket to urge the lips of the seal jacket against the surfaces to be sealed. Seals of the above-disclosed type are commercially available from various sources, such as Parker Seal Company; W. H. Shamban & Company; or The Fluorocarbon Company.

In conjunction with the seals above described, I employ a valve plunger which has its exterior provided with a high degree of finish, so that the combination of low friction characteristics of Teflon combine with the high finish on the plunger to require very low breakaway pressures to move the plunger from a stationary position.

In the valve shown in FIG. 1, the valve plunger 15 is made of stainless steel and is plated with approximately 0.0004 to 0.0006 inches (0.01–0.015 millimeters) of hard chrome plating. The plating is buffed to a finish of about 15 to 20 RMS and the plunger has an outside diameter of about one quarter of an inch (6.35000 millimeters). The outside diameter may vary slightly, but it has been determined that when such diameter reaches three eighths of an inch (9.52500 millimeters) the breakaway pressure becomes too great for an industry standardly-accepted solenoid.

As before mentioned, there are four chambers within the valve body, namely, chamber 17.3 in communication with the pressure port 20; chamber 17.2 in communication with the cylinder port 19; chamber 17.1 in communication with the tank port 18; and chamber 17 to the left of chamber 17.1 and termed a balancing chamber which is not in communication with any port.

The valve plunger 15 has axial openings 15.1 and 15.2 extending inwardly from opposite ends and blocked from communication with each other by an intermediate solid portion 15.3 of the plunger. The plunger has a pair of radial ports 15.4 and 15.5 in communication with the opening 15.2, the ports 15.5 being adjacent to and on the right side of the solid blocking portion 15.3. The plunger has radial ports 15.6 adjacent to and to the left of the blocking portion and a further pair of radial ports 15.7 and 15.8 adjacent to the balancing chamber 17.

In the normally open position of the valve, as shown in FIG. 1, fluid under pressure enters valve port 20, passes through separator bores 16 and enters pressure chamber 17.3. With the valve plunger in resting position, fluid under pressure passes from chamber 17.3 through radial ports 15.4, through the interior 15.2 of the plunger, and outwardly through radial ports 15.5 to cylinder chamber 17.2, from where it will pass through separator bores 16 to the cylinder port 19. It should be noted that radial ports 15.6 are also in communication with cylinder chamber 17.2 in the normally open position of the valve, so that fluid under pressure will flow through plunger opening 15.1 and outwardly thereof through radial ports 15.7 and 15.8, to balancing chamber 17.

When the valve plunger is moved to the right from its position of FIG. 1 to the position shown in FIG. 2, the radial ports 15.5 pass underneath the seal 26.1 and since these ports contain fluid under pressure, the inner peripheral part of this seal is either lifted slightly from the outer surface of the valve plunger, or in any event is prevented from being forced down into the radial ports 15.5. This action not only decreases resistance to plunger movement but also prevents cutting of the seal by the radial ports 15.5.

At the same time the valve plunger is being shifted to the right, the radial ports 15.7 cross the seal 26.2 which is disposed between the balancing chamber 17 and the tank chamber 17.1, and since fluid under pressure is present within the plunger opening 15.1 and within the radial ports 15.7, the inner peripheral part of seal 26.2 will either be lifted from the outer surface of the plunger or at least be prevented from being forced into the radial ports.

In any movement of the plunger 15, it will be appreciated that whenever a radial port in the plunger passes across a seal, the flow of fluid is from the inside to the outside of the plunger to act on the seal or seals in the manner described above. The outside diameter of the valve plunger, the outside diameter of the seal when uninstalled, and the diameter of the separator opening 24 should be so proportioned that the diametrical squeeze on the seal, when installed, in about 0.010 inches (0.3700 millimeters).

A valve made in accordance with the foregoing disclosure will operate with a breakaway pressure of about 14 to 17 pounds, so that the valve plunger may be shifted from a resting position to another position by use of an industry standardly-accepted solenoid, such as the Decco 11404, commercially available from the Detroit Coil Company.

In view of the foregoing, it will be appreciated that my invention produces valve construction wherein the valve plunger may be moved from resting position with a low breakaway pressure that may be supplied by a solenoid which is small enough as to be accepted by the industry. In contrast, if any one or more of the factors hereinbefore specified are substantially changed, the breakaway pressure becomes so great that either an extremely large solenoid is required, or a fluid-powered piston is necessary to shift the plunger. The industry will not accept large solenoids because of mounting space requirements and also because of the amount of current required for the inrush and holding of the solenoid, and fluid-powered pistons increase the cost of the valve.

I claim:
1. In a reciprocating control valve having:
a valve body provided with an elongated bore therein and a plurality of spaced ports therealong intersecting said bore,
an elongated plunger reciprocably received within said bore, said plunger including spaced hollow portions therewithin having radial ports extending therefrom for controlling flow of fluid between said valve body ports,
an electric solenoid of commercially available manufacture cooperatively associated with said plunger for effecting lifting movement thereof in controlling fluid flow, and,
a plurality of seals carried by said body encircling said bore and in sealing contact with said plunger to prevent fluid flow through said bore other than through said ported plunger;
the improvement therein to reduce to a minimum the required breakaway pressure to initiate movement of said plunger from a stationary condition and require minimum pressure in axially shifting the same, comprising:
said plunger having a buffed, chrome-plated exterior surface to provide maximum smoothness of surface,
said plunger having a diameter less than three-eighths of an inch ($\frac{3}{8}$") thereby to minimize the total surface area subject to sliding friction,
said seals being formed from extremely low-friction material such as polytetrafluoroethylene, and
said seals further having a generally C-shaped cross-section and opening axially of the valve body, with said seals having curved lips thereby to dispose a single lip of said seal in substantially line contact with said plunger and thereby as a valve port of said plunger passes thereunder, fluid in said plunger exerts pressure outwardly against said lip flexing the same to eliminate frictional contact therewith,
whereby friction throughout said valve body and valve plunger contact zones are maximally reduced for easy operation of the valve.

* * * * *

UNITED STATES PATENT OFFICE
CERTIFICATE OF CORRECTION

PATENT NO. : 4,133,348
DATED : January 9, 1979
INVENTOR(S) : Russell W. Spitz

It is certified that error appears in the above-identified patent and that said Letters Patent are hereby corrected as shown below:

In the single claim, line 12, "lifting" should be --shifting--.

Signed and Sealed this

Seventeenth Day of April 1979

[SEAL]

Attest:

RUTH C. MASON
Attesting Officer

DONALD W. BANNER
Commissioner of Patents and Trademarks